United States Patent [19]

Aitken et al.

[11] 3,948,847

[45] Apr. 6, 1976

[54] PROCESS FOR THE MANUFACTURE OF POLYMER SOLUTIONS

[75] Inventors: Roxburgh Richmond Aitken; James Peter Brown, both of Manchester, England

[73] Assignee: Imperial Chemical Industries Limited, London, England

[22] Filed: Aug. 10, 1971

[21] Appl. No.: 170,053

Related U.S. Application Data

[63] Continuation of Ser. No. 799,488, Feb. 14, 1969, abandoned.

[52] U.S. Cl....... 260/34.2; 260/31.2 N; 260/75 NK; 260/77.5 AA
[51] Int. Cl.² C08G 18/08; C08G 18/12; C08K 5/10
[58] Field of Search ....... 260/34.2, 77.5 A, 77.5 SP, 260/31.2 N, 32.6 UA, 77.5 AA, 75 NK

[56] References Cited

UNITED STATES PATENTS

| 3,365,526 | 1/1968 | Wieden | 264/176 |
|---|---|---|---|
| 3,373,143 | 4/1968 | Chilvers | 260/75 |
| 3,379,670 | 4/1968 | Corradi | 260/32.6 |
| 3,428,611 | 2/1969 | Brotherton | 260/75 |
| 3,463,616 | 8/1969 | Corradi | 23/263 |
| 3,642,703 | 2/1972 | Seizuki | 260/77.5 |

FOREIGN PATENTS OR APPLICATIONS 1,071,425   7/1967   United Kingdom

OTHER PUBLICATIONS

Sainder & Frisch, *Polyurethanes Chemistry & Technology* Part II 475 U.S.P.O.

*Primary Examiner*—Allan Lieberman
*Attorney, Agent, or Firm*—Cushman, Darby & Cushman

[57] ABSTRACT

A process for manufacture of solutions of polymers of high molecular weight by carrying out a reaction in solution leading to formation of the polymer, wherein the reaction is carried out initially in the presence of only a portion of the total solvent to be used, until the viscosity of the solution approaches or exceeds the value finally desired, and thereafter the remainder of the solvent is added whilst reaction is still proceeding.

1 Claim, No Drawings

PROCESS FOR THE MANUFACTURE OF POLYMER SOLUTIONS

This application is a streamlined continuation application Ser. No. 779,488 filed Feb. 14, 1969, now abandoned.

The present invention relates to an improved process for the manufacture of polymer solutions.

A number of industrial uses exist for solutions of synthetic polymeric materials in volatile solvents in which there is a relatively high viscosity achieved at low solids content by the use of polymers of high molecular weight, for example, solutions of high molecular weight polymers are used as adhesives or as coatings on fabrics.

Such solutions are commonly obtained by manufacturing the polymer by reacting together suitable intermediates without diluents and dissolving the resultant solid in the desired solvent. However such a process has the disadvantage that polymers of the desired high molecular weight do not dissolve readily. To facilitate dissolving the polymers in the solvent the operations of kneading and shredding which provide intimate contact between the solvent and polymer are frequently used but in these operations some degradation is likely to occur.

Alternatively, it has been proposed to carry out the polymerisation reaction in solution until a solution of the desired viscosity is obtained. However, such a procedure, frequently involves a protracted period of reaction beyond that which is commercially desirable. It has now been found that the time of reaction in the preparation of solutions of polymers of high molecular weight can usefully be shortened by carrying out the reaction initially in the presence of only a portion of the total solvent to be used, until the viscosity attained by the reaction mixture approaches or if desired, exceeds that finally desired, and thereafter adding the remainder of the solvent whilst reaction is still proceeding. Thus the increase in viscosity caused by polymerisation is counterbalanced by the decrease in viscosity consequent upon dilution.

If desired, the solvent can be added in two or three portions at discrete intervals, allowing a sufficient period of time between additions for the viscosity to rise; it is preferred, however, to add the solvent in a continuous or semicontinuous manner once the viscosity of the original mixture has approached that finally desired, so that the reaction is thereafter carried out at or near the finally desired viscosity.

The process can be applied to the manufacture of solutions of polymers, e.g. addition or condensation polymers. Typical of addition polymers are those in which an unsaturated monomer is polymerised by a free radical mechanism. Typical unsaturated monomers include vinyl esters e.g. vinyl acetate, esters of unsaturated acids, e.g. methyl methacrylate, unsaturated hydrocarbons, e.g. styrene, and hydrocarbons with conjugated unsaturation e.g. butadiene. Polymerisation may be initiated by methods well known in the art.

However the process is more usefully applied in the manufacture of polymers by a condensation process. Typical polymers which may be made using the new process are polyesters, polyamides and polyurethanes. Because the solvent used is, by virtue of the use to which the solutions are to be put, volatile, the present process is particularly advantageous in condensation processes in which reaction occurs at a temperature at or below 150°C. preferably 100°C. The process is therefore particularly advantageous in the manufacture of polyurethanes. Nevertheless provided equipment is available which will allow manufacture to be carried out above the boiling point of the solvent, the present process can be applied to polymerisation processes requiring temperatures above 150°C.

The molecular size of the polymer can be controlled by the use of type and proportions of reactant in the usual manner. The reactants should be chosen so that the polymer produced is essentially linear although a small proportion of reactants capable of introducing branch points in the polymer may be present. In the case of linear polyurethanes, the essential reaction will normally be between an organic diisocyanate on one hand, and a compound having 2 hydroxyl groups per molecule, for example, a polyester, polyesteramide or polyether. For introduction of branching, a small amount of a triisocyanate or triol of low molecular weight can be used or the polyester, polyesteramide or polyether can contain a limited amount of branching. The only critical limit to the amount of branching is that it should be insufficient to cause gellation and insolubility of the final polymer. In order to obtain high molecular weights the NCO:NCO-reactive groups ratio should be close to 1.

The new process is particularly useful for the manufacture of solutions, of low solids content, of polyurethanes of high molecular weight. Additionally it is particularly useful for the manufacture of polyurethane solutions in general where the reactants or solvent are relatively non-polar that is to say where the ratio of oxygen-containing groups, such as ether, ester, and carbonyl, is low in comparison with the number of hydrocarbon groups.

The present process is particularly useful in polyurethane manufacturing processes in which it is desired to prepare polyurethanes from diisocyanates and polyethers, polyester or polyesteramides of molecular weight, 800 – 5000, preferably 800 – 3000 optionally in the presence of compounds of low molecular weight which are difunctional with respect to diisocyanates. Typical of the latter compounds are water, diols, hydroxyamines or diamines. A particularly advantageous aspect of the new process is that in which the polyether, polyester or polyesteramide, optionally admixed with the above low molecular weight materials, is reacted with an excess of diisocyanate to form a polymer with two terminal isocyanate groups and this diisocyanate is reacted with a low molecular weight difunctional compound as defined above.

As is clearly apparent, whereas the new process is particularly useful in connection with the manufacture of solutions of polyurethanes, the principle can equally well be extended in suitable cases to the manufacture of other polymers capable of synthesis in solution.

The invention is illustrated but not limited by the following Examples in which parts and percentages are by weight:

EXAMPLE 1

400 Parts of a polyesteramide, acid value 1.0 mg.KOH/g., hydroxyl value 109.4 mg.KOH/g. obtained by condensing 200 parts of 1,6-hexane diol, 7.875 parts of monoethanolamine and 212 parts of adipic acid at temperatures up to 230°C., are dissolved in 163 parts of ethyl acetate, 0.4 part of 4-diethylaminopyridine and 88.9 parts (1.3 moles) of an 80:20 mixture of 2,4- and 2,6-tolylene diisocyanates are added and the mixture is heated and stirred at 60°C. for 12 hours. The isocyanate content is measured and 4.5 parts of a 50:50 molar water/ethylene glycol mixture, equivalent to the isocyanate content of 1.48% are added and stirring is continued at 60°C. until the viscosity of a sample measured at 25°C. is about 400 poises. Still maintaining a temperature of 60°C., 733 parts of ethyl acetate are added at such a rate that continuing reaction counteracts the dilution effect and the viscosity remains constant (i.e. at about 400 poises at 25°C.). The isocyanate content is remeasured and 1.73 parts of monoisopropanol amine, equivalent to the isocyanate content (0.03%) plus an excess equivalent to 0.04% isocyanate, are added and the mixture is stirred at 60°C. for 1 hour. 0.68 Part of salicyclic acid and 4.72 parts of diethyl oxalate are then added and the mixture is stirred at 60°C. for 1 hour then cooled and discharged. The product has viscosity 417 poises at 25°C; solids content 34.9%.

The reaction time from the stage where the water-/ethylene glycol is added to that where the monoisopropanolamine is added is about 29 hours. When all of the ethyl acetate is added initially i.e. before any reaction with isocyanate takes place, the reaction time for the same stage is about 140 hours.

EXAMPLE 2

400 Parts (1 mol) of the polyesteramide of Example 1 are dissolved in 163 parts of ethyl acetate, 0.4 part of 4-dimethylaminopyridine and 88.9 parts (1.3 moles) of an 80:20 mixture of 2,4- and 2,6- tolylene diisocyanates are added and the mixture is heated and stirred at 60°C. for 12 hours. The isocyanate content is measured and 10.5 parts of 1,4-butane diol, equivalent to the isocyanate content of 1.54% are added and stirring is continued at 60°C. until the viscosity of a sample measured at 25°C. is about 450 poises. Still maintaining a temperature of 60°C., 733 parts of ethyl acetate are added at such a rate that continuing reaction counteracts the dilution effect and the viscosity remain constant (i.e. about 450 poises measured at 25°C.). The isocyanate content is remeasured and 1.67 parts of monoisopropanolamine, equivalent to the isocyanate content (0.03%) plus an excess equivalent to 0.04% isocyanate are added. The mixture is stirred at 60°C. for 1 hour, then 0.68 parts of salicyclic acid and 4.72 parts of diethyl oxalate are added and the mixture is stirred at 60°C. for 1 hour, cooled and discharged. The product has viscosity at 25°C. 447 poises; solids content 36.1%.

EXAMPLE 3

400 Parts of a polyesteramide, acid value 1.85 mg. KOH/g., hydroxyl value 56.0 mg.KOH/g. obtained by condensing 280 parts of adipic acid, 121 parts of ethylene glycol, 11.5 parts of diethylene glycol and 7.25 parts of monoethanolamine at temperatures up to 230°C., are dissolved in 550 parts of ethyl acetate. 0.4 Parts of 4-diethylaminopyridine, 0.05 part of water, and 48.2 parts (1.3 moles) of an 80:20 mixture of 2,4- and 2,6- tolylene diisocyanate are added and the mixture is heated and stirred at 60°C. for 16 hours. The isocyanate content is measured and 1.9 parts of a 50:50 molar water/ethylene glycol mixture, equivalent to the isocyanate content of 0.37% are added and stirring is continued at 60°C. until the viscosity of a sample measured at 25°C. is about 1000 poises. Still maintaining a temperature of 60°C., 270 parts of ethyl acetate are added and when the viscosity of a sample measured at 25°C. is about 300 poises a further 210 parts of ethyl acetate are added and reaction is allowed to continue until the viscosity measured at 25°C. is about 125 poises. The isocyanate is remeasured and 2 parts of monoisopropanolamine, equivalent to the isocyanate content 0.065% plus an excess equivalent to 0.04% isocyanate are added and the mixture is stirred at 60°C. for 1 hour. 3.3 Parts of diethyl oxalate are then added and the mixture is stirred at 60°C. for 1 hour then cooled and discharged. Viscosity measured at 25°C. was approximately 100 poise.

The reaction time from the stage where the water-/ethylene glycol is added till the monoisopropanolamine is added is about 12 hours. When all of the ethyl acetate is added initially i.e. before any reaction with isocyanate takes place the reaction time for the same stage is about 85 hours.

EXAMPLE 4

A solution of 400 parts of the polyesteramide of Example 1, 0.2 parts of 4-dimethylaminopyridine, 1.39 parts of water, 4.78 parts of ethylene glycol and 88.3 parts of an 80:20 mixture of 2,4- and 2,6- tolylene diisocyanates in 162.7 parts ethyl acetate is stirred at 60°C. in a stream of nitrogen gas until the reaction which occurs causes the viscosity of a sample measured at 25°C. to be about 600 poises. Still heating at 60°C. 744 parts of ethyl acetate are added at such a rate that continuing reaction counteracts the dilution effect and the viscosity remains about 600 poises when measured at 25°C. 1.57 Parts of monoisopropanolamine are added and the mixture is stirred for 1 hour at 60°C. 0.15 Parts of salicyclic acid and 4.72 parts of diethyl oxalate are then added and stirring at 60°C. is continued for 1 hour. The product has a viscosity of 545 poises at 25°C., solids content 36.6%.

EXAMPLE 5

A solution of 400 parts of the polyesteramide of Example 3, 0.2 parts of 4-dimethylaminopyridine and 39.9 parts of an 80:20 mixture of 2,4- and 2,6- tolylene diisocyanates in 293.3 parts of ethyl acetate is stirred at 60°C. in a stream of nitrogen until reaction causes the viscosity measured at 25°C., to rise to 600 poises. Still maintaining a temperature of 60°C., 524 parts of ethyl acetate are added at such a rate that the viscosity measured at 25°C., is maintained between 400 and 500 poises. 2.17 Parts of monoisopropanolamine are added and the mixture is stirred at 60°C. for 1 hour. 0.45 Parts of salicyclic acid and 4.2 parts of diethyl oxalate are then added and stirring is continued at 60°C. for 1 hour. The product has a viscosity of 358 poises at 25°C; solids content 35.3%.

EXAMPLE 6

A solution of 400 parts of the polyesteramide of Example 3, 0.2 parts of 4-dimethylaminopyridine and 39.9 parts of an 80:20 mixture of 2,4- and 2,6-tolylene diisocyanates in 511.2 parts of ethyl acetate is stirred at 60°C. in a stream of nitrogen gas for 12 hours. The isocyanate content is measured and 0.71 parts of 1,4-butane diol, equivalent to the residual isocyanate content, is added and stirring is continued. When the viscosity, measured at 25°C., reaches 900 poises, 280 parts of ethyl acetate are added at such a rate that the viscosity, measured at 25°C., remains in the range 250 to 450 poises. 1.94 Parts of monoisopropanolamine are then added and the mixture is stirred at 60°C. for 1 hour at which stage 0.45 parts of salicyclic acid and 4.27 parts of diethyl oxalate are added and the mixture is again stirred for 1 hour at 60°C. The product has viscosity at 25°C. of 243 poises,; solids content 35.7%.

We claim:

1. A process for the manufacture of a solution of high molecular essentially linear polyurethane elastomer which comprises reacting together, in a first portion of a liquid which is a solvent for the polyurethane, an organic diisocyanate, an essentially linear hydroxyl-terminated polyester, polyesteramide or polyether and a low molecular weight difunctional isocyanate-reactive compound the amount of said liquid in said first portion being less than sufficient for a solution in that amount of solvent of all of the polyurethane to be formed from the initial reactants to have a viscosity which does not exceed the viscosity desired for the final product, initially carrying out the reaction in said first portion of solvent until formation of polyurethane increases the viscosity to substantially the value desired for the final product and thereafter continuing the reaction while adding the remaining solvent for the polyurethane in a continuous manner and at such a rate that the viscosity of the solution remains substantially constant at the value desired for the final product, whereby the viscosity-reducing effect of the solvent addition counteracts the viscosity-increasing effect of the continuing reaction, and finally terminating the reaction when the desired concentration of polyurethane in the solution has been achieved.

* * * * *

UNITED STATES PATENT OFFICE
CERTIFICATE OF CORRECTION

Patent No. 3,948,847             Dated  April 6, 1976

Inventor(s)  ROXBURGH RICHMOND AITKEN ET AL

It is certified that error appears in the above-identified patent and that said Letters Patent are hereby corrected as shown below:

In the Heading:

The heading should reflect the fact that there is a claim for priority based on British application 20215/68 filed in Great Britain on April 29, 1968 and the Complete Specification filed January 17, 1969.

Signed and Sealed this

Twenty-second Day of March 1977

[SEAL]

Attest:

RUTH C. MASON
Attesting Officer

C. MARSHALL DANN
Commissioner of Patents and Trademarks